United States Patent Office 3,069,305
Patented Dec. 18, 1962

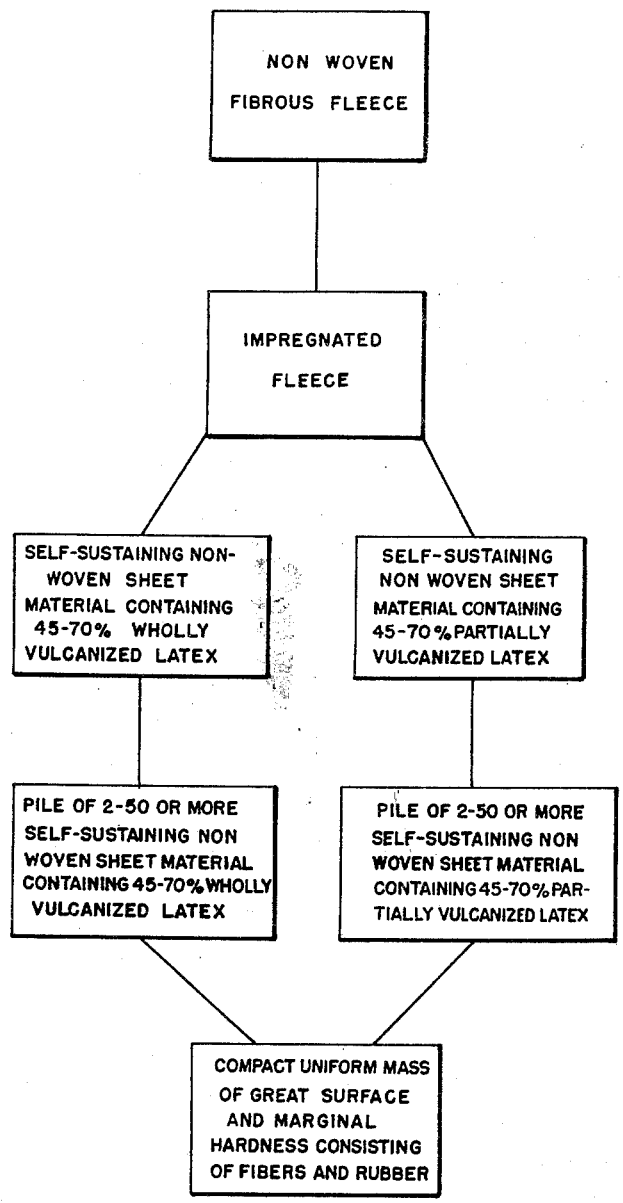

3,069,305
METHOD OF MAKING NOVEL FIBROUS PRODUCTS CONTAINING NATURAL OR ARTIFICIAL RUBBER AS A BONDING AGENT
Erich Fahrbach, Wilhelm Lauppe, and Robert Schabert, Weinheim an der Bergstrasse, Wilhelm Heling, Bensheim-Auerbach an der Bergstrasse, and Carl-Ludwig Nottebohm, Weinheim an der Bergstrasse, Germany, assignors to Firma Carl Freudenberg, Kommanditgesellschaft auf Aktien, Weinheim an der Bergstrasse, Germany
Filed Nov. 16, 1959, Ser. No. 853,315
Claims priority, application Germany Sept. 22, 1955
3 Claims. (Cl. 156—338)

This invention relates to a method of making novel fibrous products containing natural or artificial rubber as a bonding agent.

This application is a continuation-in-part of our United States patent application Serial No. 611,746, filed September 24, 1956.

Fibrous products stabilized by bonding agents are commonly named non-woven fabrics in order to demonstrate the difference from the so-called woven fabrics, in which the individual fibers are arranged in warp and weft direction. The fibers in a non-woven fabric, however, are arranged in random direction. A fibrous fleece (this term is restricted to a web in which only fibers in random direction are present) may be converted into a non-woven fabric by impregnation with liquid or pasty rubber latex containing vulcanizing ingredients. The resulting impregnated fibrous fleece is then subjected to heat with or without pressure whereby the latex becomes vulcanized. After vulcanization the individual fibers are firmly stuck together by the rubber, but there still remain many interstices between the single fibers.

The manufacture of non-woven fabrics by impregnating a fiber fleece with natural or synthetic rubber latex is described in our United States Patents 2,719,802, 2,719,803, 2,719,806, 2,774,687, etc. The products which result from these procedures are particularly suitable for use as interlinings in clothing. Their maximum thickness is about 1 to 2 millimeters. It is not possible to make thicker products because the impregnated fiber fleeces must be squeezed by rolls to reach a uniform wet pick-up before subjecting them to heat. A wet pick-up which is not uniform throughout the impregnated web would cause serious deterioration during vulcanization. It is further obvious that too thick a web cannot be uniformly heated, so that the latex in the inner parts would still be in liquid condition when the latex in the outer parts was fully vulcanized.

It has now surprisingly been found that a new type of relatively thick non-woven fabrics (consisting of any of the usual fiber types with the exception of glass fibers) can be made by simply superimposing 2–50 or more self-sustaining layers of the non-woven fabric containing fully or partially vulcanized rubber and subjecting them to heat and pressure. The product is a compact mass in which the individual sheets or layers of the starting material have vanished.

Accordingly, the invention provides a method of making material of great surface and marginal hardness and at the same time good compressibility, consisting of fibers and natural or synthetic rubber, which method comprises impregnating a fibrous fleece (as hereinbefore defined) with an aqueous natural or synthetic rubber latex or another curable bonding agent so as to incorporate 45 to 70 percent by weight of said bonding agent, subjecting the resulting fiber fleece to heat whereby a total or partial vulcanization of the bonding agent takes place, superimposing several sheets of the resulting self-sustaining non-woven fabrics and subjecting them to heat and pressure.

Of particular advantage are latices of synthetic rubbers containing functional groups, for example copolymerization products of diolefines with acrylic acid, methacrylic acid, and derivatives thereof, which substances are able to cross-link with other components of the impregnating agent and/or the fibers, particularly with so-called chemical fibers like polyamides and the like.

It is further of advantage to employ impregnation agents which contain the recited film-forming agents in combination with aminoplasts and/or phenoplasts in the form of still water soluble pre- or intermediate condensation products of formaldehyde with urea, phenols, triazines or derivatives thereof, and/or polyester resins or ethoxylin resins. Such combinations have proven to be particularly suitable for cross-linking.

For the impregnation, aqueous dispersions or emulsions and also solutions may be used, which contain bonding agents of the character set forth above and which may contain, in addition, curing agents, condensation catalysts, wetting agents, anti-ageing agents, fillers, and the like. It is generally of advantage to introduce the impregnating agents in the foamed state into the fibrous structures.

The accompanying drawing shows several alternate procedures in accordance with the present invention.

This novel material is particularly suitable for roll coverings for squeezing rolls, calender rolls, embossing rolls and pressure rolls.

Example 1

A sliver of nylon waste, containing fibers of 1.5 to 7 den. obtained from three cards is continuously cross-wise superposed to a fleece of 16 layers having a weight of 340 g./m.$^2$. Said fleece, in which the fibers run in inter-crossing directions, is coated at one side with a small amount of an aqueous, preferably foamy dispersion of an adhesive to obtain a one-sided superficial pre-solidification while maintaining the interstices between the fibers of the surface layer. The dispersion has the following composition:

| | Parts |
|---|---|
| Revertex (75% natural rubber concentrate) | 137 |
| Wetting agent (alkyl aryl sulfonate) | 15 |
| Tetramethylthiuramdisulfide | 3.5 |
| Antioxidant (phenyl beta-naphthylamine) | 2 |
| S coll. | 3 |
| ZnO act. | 15 |
| Water | 890 |

After drying, the fleece, which is superficially presolidified at one side, is impregnated with the following dispersion.

| | Parts |
|---|---|
| Revertex | 137 |
| Wetting agent | 15 |
| Tetramethylthiuramdisulfide | 3.5 |
| S coll. | 3 |
| ZnO act. | 15 |
| Antioxidant (phenyl beta naphthylamine) | 2 |
| Water | 210 |

The dispersion is converted into a foam, and the foam is introduced in homogeneous distribution into the fibrous material. The impregnated material is dried, washed, again dried, and subsequently subjected to an impregnation with a dispersion of the following composition:

| | Parts |
|---|---|
| Water-soluble melamine-formaldehyde resin | 153 |
| Condensation accelerator | 7 |
| Dicyanodiamide | 26 |
| Water | 814 |

The impregnated fibrous material is heated on drying rollers, whereby further condensation of the melamine resin takes place. The thus obtained material, which contains about 20 percent of condensation resin, calculated on the weight of the structure, is cut into plates and 4 plates are placed upon each other alternately in longitudinal and transverse direction. This multilayer structure of about 10 mm. thickness is subjected to compression at a specific pressure of 100 kg./cm.² and a temperature of 135° C. for a period of 20 minutes and converted to a structure which is only about 1.5 mm. thick. The thus obtained plates have an edge shore hardness of about 92° and show very high elasticity and compressibility. The produced material has a density of 1.08 and is particularly suitable as covering for rollers and as a sealing compound.

*Example 2*

From 60% of polyamide waste (so-called Perlon waste), average titer 45 den., and 40% of highly stretched polyester fibers (Diolen) of 2.75 den., a fiber fleece is produced on two cards and said fleece is cross-wise superposed in 12 layers. In this way, a cross-laminated batting of 300 g./m.² is produced. Said batting is placed on a screen and passed through an impregnating bath of the following composition:

| | Parts |
|---|---|
| Chlorobutadiene polymer, in the form of an emulsion (45% concentrate), solid | 100 |
| Active ZnO, solid | 5 |
| Coll. sulfur, solid | 1 |
| Antioxidant, solid | 1 |
| Emulsifier (fatty acid condensation product), solid | 4 |
| Vulcanization accelerator NP (triazine derivative), solid | 1 |
| Wetting agent (aryl alkyl sulfonate), solid | 5 |
| Water | 387 |

After squeezing and drying, an intermediate material is obtained, which contains about 40 percent of the impregnating agent, calculated on the total weight. This intermediate is vulcanized, but in not yet completely cured state is subjected to an after-impregnation with a colloidal dispersion of the following composition:

| | Parts |
|---|---|
| Water-soluble melamine-formaldehyde pre-condensate (solid) | 75 |
| Zinc chloride (as condensation accelerator) | 3 |
| Dicyanodiamide | 13 |
| Water | 909 |

The structure is dried on drying rollers, whereby further condensation of the melamine resin takes place. The thus obtained structure, which is still in the deformable plastic state and contains about 7.5 percent of the resin, is divided into sheets of the desired size, which are superposed in 4 layers. Said multilayer structure, which is about 6 mm. thick, is compacted with a specific pressure of 5 kg./cm.² at a temperature of 135° C. within 15 minutes to a thickness of about 2 mm. Hereby, a further vulcanization and condensation takes place, which, if necessary by further heat treatment, is completed until complete curing and condensation is obtained. A structure of very homogeneous composition is obtained which has a density of 0.96, and edge shore hardness of about 94° and a very high elasticity and compressibility. Discs from this material are particularly suitable for the manufacture of coverings for squeeze rolls, calendering rolls, friction rolls, embossing rollers and printing rollers. Such roller coverings can be made in the usual manner by punching annular discs and placing such discs one upon another on a mandrel, on which they are held together by a locking disc; they are then axially compressed under a specific pressure of about 100 kg./cm.², whereby further compacting takes place. The surface hardness of such coverings is about 96° (Shore).

*Example 3*

According to the Random-Web process, a fleece is blown, which consists of 50 percent of polyester fibers (Diolen) with an average titer of 5 den. and 50 percent of ramie doffings, and has a weight of 200 g./m.². This fleece is placed in an impregnating bath of the following composition:

| | Parts |
|---|---|
| Desmophen 200 (cross-linked polyester from adipic acid, triol and butylene glycol) | 200 |
| Desmodur TH (reaction product of toluylene diisocyanate with poly-alcohols in 75% solution of ethyl acetate) | 208 |
| Trichloroethylene | 592 |

The fibrous structure impregnated with this mixture is squeezed out and while still tacky and somewhat wet by the solvent, is superposed in several, for instance 3, layers. The obtained multilayer structure, which is in the state of beginning reaction, is continuously (for instance in a vulcanizing machine) compressed under a specific pressure of 5 kg./cm.² at a temperature of 140° C. and at a rate of 5 meters per hour. The obtained bandlike structures have a thickness of 1.5 mm., a density of 1.14, a breaking strength of about 500 kg./cm.² and a breaking elongation of about 25%. The permanent elongation is so small that the material is suitable for bands subjected to tensile loads.

If instead of cross-laminated fleeces, fleeces with longitudinally directed fibers, for instance polyamide fibers of 1.5 denier, are used, and the impregnated structures are superposed in multilayers, the breaking strength may be increased from 500 kg./cm.² to about 1500 kg./cm.² and more.

The material obtained according to Example 3 may be used as covering for rollers and for sealing purposes; in spite of the high edge Shore hardness of 96° it possesses excellent rebound elasticity.

*Example 4*

By the Random-Web process, a fleece is produced which consists of 50 percent of polyamide fibers (3 denier), 30 percent of polyvinyl chloride fibers (1.5 denier), and 20 percent of cotton fibers (1.5 to 3 denier) and has a weight of 250 g./m.². The fleece is pre-solidified by warm calendering and impregnated with a foamed dispersion of the following composition:

| | Parts |
|---|---|
| Butadiene - styrene - methacrylic acid copolymer (67:25:8), in which the methacrylic acid is the carrier of functional groups (carboxyl group), solid | 100 |
| Water - soluble phenol - formaldehyde condensate, solid | 6 |
| Vulcanization accelerator (zinc salt of 2-mercaptobenzothiazol), solid | 2 |
| Zinc oxide, active, solid | 5 |
| Coll. sulfur, solid | 1 |
| Antioxidant (2-mercaptobenzimidazol), solid | 2 |
| Wetting agent (alkyl aryl sulfonate), solid | 12 |
| Water | 322 |

The mixture is converted to an emulsion, and the fibrous fleece is passed on a conveyor belt through a bath containing the emulsion. Then the structure is squeezed to a content of 45 percent of the impregnating agent, calculated on the weight of the fleece. The squeezed material is dried, curing is started, then the material is washed, dried again and subjected to an after-impregnation with a 10% solution of polyamide in a mixture of 7 parts of methanol, 2 parts of benzene, and 1 part of water. The after-impregnated structure is dried at 90° C. and superposed in 3 layers; the multilayer structure is compressed at 125° C. and a pressure of 50 kg./cm.² for 17 minutes in a platen press to ⅙ of the initial volume. The compression is carried out under conditions where a complete curing and condensation is obtained simultaneously with the compacting procedure.

The compacted material is worked up to annular discs which are superposed around a mandrel and thereon further compacted by an axial pressure of 40 kg./cm.² The thus obtained roller covering is maintained under pressure by means of a locking disc.

The compacting of the discs may also be carried out at lower temperatures within shorter periods of time, for instance at 70° C. within a few seconds. Subsequently, they are subjected to curing and condensation by a suitable heat treatment, whereupon they are superposed on the mandrel and there further compacted at higher pressures. Rollers with such coverings can be subjected to high pressures without separation of the covering from the roller core. Such rollers are useful as squeeze rolls or as embossing rollers.

What we claim is:

1. A method of making a material of high surface and marginal hardness and of good compressibility comprising the steps of superimposing a plurality of self-sustaining individual sheets of a non-woven fabric, each said sheet essentially consisting of a multiple layer fleece of cardable fibers having distributed therethrough about 45 to 70% by weight of partially or wholly vulcanized latex, and each said sheet having a thickness of from 1 to 2 mm., thereafter compressing said superimposed sheet material at a specific pressure of between about 5 to 100 atmospheres at a temperature of about 125 to 140° C. for a period of time sufficient to thereby obtain integration of said individual sheets into a compact single unitary structure of high density having a total thickness appreciably less than the aggregate thickness of said sheets.

2. A method in accordance with claim 1 in which said pressure is sufficient to compress said individual sheets into said unitary structure of a total thickness up to one-half of the aggregate thickness of said sheets.

3. A method in accordance with claim 1 in which said latex is distributed through said fleece together with a melamine formaldehyde resin, said resin being substantially water-soluble as an impregnant for said fleece, and the aggregate of said latex and of said resin in said fleece being about 45–70% by weight.

References Cited in the file of this patent

UNITED STATES PATENTS

| | | |
|---|---|---|
| 1,365,878 | Weiss | Jan. 18, 1921 |
| 2,041,520 | Bamford | May 19, 1936 |
| 2,748,049 | Kalafus | May 29, 1956 |
| 2,801,461 | Kusters | Aug. 6, 1957 |

UNITED STATES PATENT OFFICE
CERTIFICATE OF CORRECTION

Patent No. 3,069,305                      December 18, 1962

Erich Fahrbach et al.

It is hereby certified that error appears in the above numbered patent requiring correction and that the said Letters Patent should read as corrected below.

Column 3, line 53, for "5 kg./cm.$^2$" read -- 25 kg./cm.$^2$ --.

Signed and sealed this 16th day of July 1963.

(SEAL)
Attest:

ERNEST W. SWIDER
Attesting Officer

DAVID L. LADD
Commissioner of Patents